(12) United States Patent
Kojima

(10) Patent No.: US 7,212,539 B2
(45) Date of Patent: May 1, 2007

(54) MULTI-SERVICE-CLASS DEFINITION TYPE ATM SWITCH

(75) Inventor: Tomoaki Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 11/023,473

(22) Filed: Dec. 29, 2004

(65) Prior Publication Data
US 2005/0111458 A1 May 26, 2005

Related U.S. Application Data

(63) Continuation of application No. 09/313,079, filed on May 17, 1999, now abandoned.

(30) Foreign Application Priority Data
May 19, 1998 (JP) ................. 10-137175

(51) Int. Cl.
*H04L 12/54* (2006.01)
(52) U.S. Cl. ................. 370/429; 370/412
(58) Field of Classification Search ........ 370/229–235, 370/389–393, 412–429, 471, 474
See application file for complete search history.

(56) References Cited

U.S. PATENT DOCUMENTS

| 5,287,500 | A | * | 2/1994 | Stoppani, Jr. ........... 711/211 |
| 5,365,519 | A | | 11/1994 | Kozaki et al. |
| 5,440,547 | A | | 8/1995 | Easki et al. |
| 5,499,238 | A | | 3/1996 | Shon |
| 5,696,764 | A | | 12/1997 | Soumiya et al. |
| 5,781,430 | A | | 7/1998 | Tsai |
| 5,991,272 | A | * | 11/1999 | Key et al. ........... 370/252 |
| 6,088,331 | A | * | 7/2000 | Beshai et al. .......... 370/232 |
| 6,301,253 | B1 | | 10/2001 | Ichikawa |
| 6,324,165 | B1 | | 11/2001 | Fan et al. |
| 6,408,006 | B1 | * | 6/2002 | Wolff .................. 370/412 |

FOREIGN PATENT DOCUMENTS

| JP | 56-32819 | 7/1991 |
| JP | 03-240338 | 10/1991 |
| JP | 4-96546 | 3/1992 |

(Continued)

*Primary Examiner*—Chi Pham
*Assistant Examiner*—Phuc Tran
(74) *Attorney, Agent, or Firm*—Sughrue Mion, PLLC

(57) ABSTRACT

A multi-service-class definition type ATM switch is basically configured by an ATM buffer device containing buffers, a data input/output device and a data processing device. The data input/output device inputs data with regard to a service class including a service category (e.g., VBR, CBR) and a QOS class, which the user needs. The data are transmitted to the data processing device, wherein the data are subjected to analysis. Herein, the data designate a buffer number and a request type, which represents one of three modes. At a data setting mode, the service class is set to the buffer designated by the buffer number within the buffers. Then, the data input/output device displays result of the setting. At a data read mode, the data are read from the buffer designated by the buffer number and are then output (or displayed) by the data input/output device. At a data renewal mode, new data are added to data storage, or unnecessary data are deleted from the data storage, so that the data input/output device displays result of renewal.

5 Claims, 8 Drawing Sheets

FOREIGN PATENT DOCUMENTS

| | | |
|---|---|---|
| JP | 4-276943 | 10/1992 |
| JP | 06-85842 | 3/1994 |
| JP | 6-338905 | 12/1994 |
| JP | 07-154424 | 6/1995 |
| JP | 7-193583 | 7/1995 |
| JP | 7-240752 | 9/1995 |
| JP | 7-321796 | 12/1995 |
| JP | 09-8812 | 1/1997 |
| JP | 9-27812 | 1/1997 |
| JP | 9-507738 | 8/1997 |
| JP | 10-13416 | 1/1998 |
| JP | 10-79979 | 3/1998 |
| JP | 11-17708 | 1/1999 |
| JP | 1-122257 | 4/1999 |

* cited by examiner

MULTI-SERVICE-CLASS DEFINITION TYPE ATM SWITCH

This is a continuation of application Ser. No. 09/313,079 filed May 17, 1999, now abandoned.

BACKGROUND OF THE INVENTION

1. Field of the Invention

This invention relates to ATM switches which use buffers to cope with multiple service classes containing service categories corresponding to CBR, VBR and Best Effort Classes, for example.

This application is based on Patent Application No. Hei 10-137175 filed in Japan, the content of which is incorporated herein by reference.

2. Description of the Related Art

Conventionally, there are provided a variety of technologies regarding the ATM networks and ATM switches (where "ATM" is an abbreviation for "Asynchronous Transfer Mode").

For example, the paper of Japanese Patent Application, Publication No. Hei 7-240752 discloses an example of the ATM switch which is designed to manage communication quality with respect to every service class. Herein, quality control is made by the setting of a switching path in response to QCC tags representing quality classes for services requested by cells.

The paper of Japanese Patent Application, Publication No. Hei 7-193583 discloses an example of the ATM multiplexing processing employed in the B-ISDN subscriber access system (where "B-ISDN" is an abbreviation for "Broadband Integrated Services Digital Network"), which provides an efficient and fair way for use of resources of the networks. Herein, input cell data are subjected to classification according to QOS (i.e., quality of service) classes and scheduling control while connection state management is effected between the network operator and ATM multiplexing processing device.

The paper of Publication No. Hei 9-507738 (which publishes the contents of Japanese translation of the International Patent Application No. PCT/FI95/00282, International Publication No. WO95/32570) discloses an example of the technology for prioritization of traffics in the ATM networks. Herein, cells are transmitted by means of buffers which are exclusively provided for a specific service class within different service classes of the ATM network. In order to concentrate resources on the subscriber application(s) at a time while maintaining the trunk network as simple as possible, division of the service classes is made by only the VPI (i.e., virtual path identifier) of the header of the cell.

The paper of Japanese Patent Application, Publication No. Hei 7-321796 disclose a virtual path shaping device for the ATM network, in which cells of different service qualities are accumulated in different buffers respectively, so that the cells of high-quality service are firstly output.

The paper of Japanese Patent Application, Publication No. Hei 10-13416 discloses an example of the ATM switch which provides output buffers with respect to different service categories corresponding to CBR, RtVBR, NrtVBR and Best Effort classes (where "Rt" denotes "real-time" while "Nrt" denotes "non-real-time"). Each of those buffers is given a specific degree of priority in cell transfer. Herein, only when cells do not exist in all of the high-priority buffers, the cell transfer is performed In addition, estimation is performed using the conventional real-time call acceptance control method, which merely copes with a single class, to estimate a cell loss ratio for the traffics multiplexing calls of multiple service categories. After the estimation, the cell loss ratio for the low-priority service category is estimated under an assumption that all of the lost cells belong to the low-priority service category.

As described above, the conventional technology is designed to execute the cell transfer only when the cells do not exist in all of the high-priority buffers within the output buffers of the ATM switch, which are provided to cope with the different service categories respectively and each of which is given a specific degree of priority in cell transfer.

FIG. 9 is a block diagram showing a configuration of the output buffers provided within the ATM switch. Herein, there are provided four types of the buffers, i.e., CBR buffers, RtVBR buffers, NrtVBR buffers and "Best Effort Classes" buffers. Using a multiplexer and the above buffers, it is possible to configure an apparatus and method for multi-service-class ATM call acceptance control.

However, the aforementioned technology suffers from problems, as follows:

(1) In the case where the user needs only a certain service category (e.g., CBR) within the service categories, it is unnecessary to provide the buffers regarding the other service categories. In this case, there occurs a reduction in a use efficiency of the buffers. Because, the ATM switch lacks a function to define the buffer(s) to be related to only the service category which is requested by the user.

(2) The conventional technology designs the ATM switch such that the buffers are fixedly used for the prescribed service categories respectively. So, the ATM switch cannot cope with addition of a new service category and deletion of the service category. Because, the ATM switch lacks a function to define the buffer(s) to cope with the addition and deletion of the service category.

SUMMARY OF THE INVENTION

It is an object of the invention to provide a multi-service-class definition type ATM switch that is capable of defining buffers to be related to multiple service classes containing service categories.

It is another object of the invention to provide a multi-service-class definition type ATM switch that is capable of coping with addition and deletion of the service category.

Basically, this invention is characterized by an improvement of the ATM switch, which provides brand-new functions that the user is capable of defining the service classes such as the service categories and QOS classes for the buffers within the ATM switch.

To secure the aforementioned functions, the ATM switch of this invention accomplishes basically four elements in operations, as follows:

i) A data input section is provided to input the buffer number representative of the buffer for which the user wishes define the service class.

ii) The data regarding the service class are transmitted to the ATM switch, wherein the data are subjected to analysis to specify the service class which should be defined for the buffer within the buffers.

iii) The ATM switch executes the data setting (or definition of the service class) with respect to the corresponding buffer. Then, processing result in the data setting (or definition) is transmitted to the data input/output device. So, a data output section outputs (or displays) the processing result.

iv) As for addition or deletion of the data regarding the service class and QOS class, the user issues a renewal request of the data by means of the data input section. Then, the data are renewed (e.g., added or deleted) and stored in the data storage sections provided within the data input/output device and data processing device respectively.

This invention describes a multi-service-class definition type ATM switch, which is basically configured by an ATM buffer device containing buffers, a data input/output device and a data processing device. The data input/output device inputs data with regard to a service class including a service category (e.g., VBR, CBR) and a QOS class, which the user needs. The data are transmitted to the data processing device, wherein the data are subjected to analysis. Herein, the data designate a buffer number and a request type, which represents one of three modes. At a data setting mode, the service class is set to (or defined for) the buffer designated by the buffer number within the buffers. Then, the data input/output device displays result of the setting. At a data read mode, the data are read from the buffer designated by the buffer number and are then output (or displayed) by the data input/output device. At a data renewal mode, new data are added to the data storage or unnecessary data are deleted from the data storage, so that the data input/output device displays result of renewal.

Thus, it is possible for the user to freely define (i.e., set, add, delete or renew) the service classes containing the service categories with respect to the buffers arbitrarily selected from the ATM buffer device.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1A:
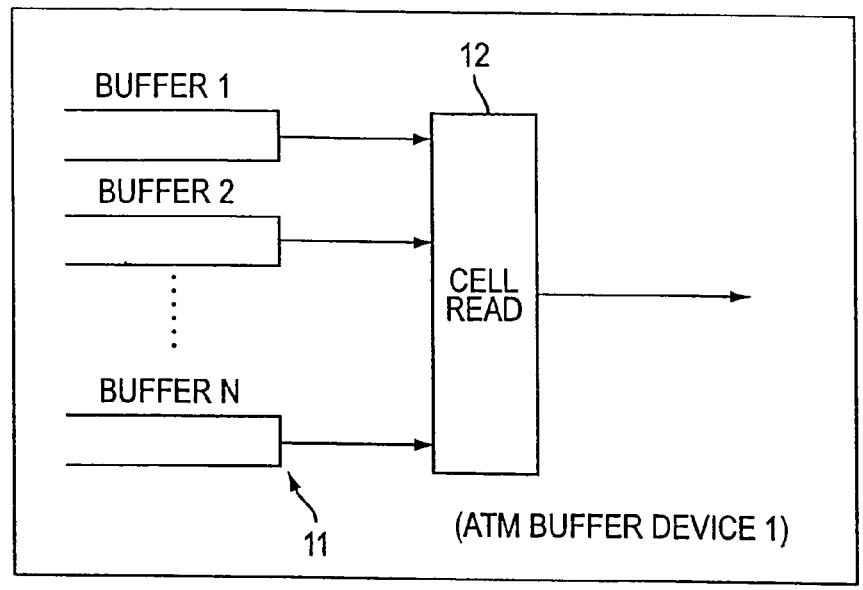
FIG. 1A is a block diagram showing a configuration of an ATM buffer device provided within an ATM switch in accordance with embodiment of the invention.
Figure 1B:
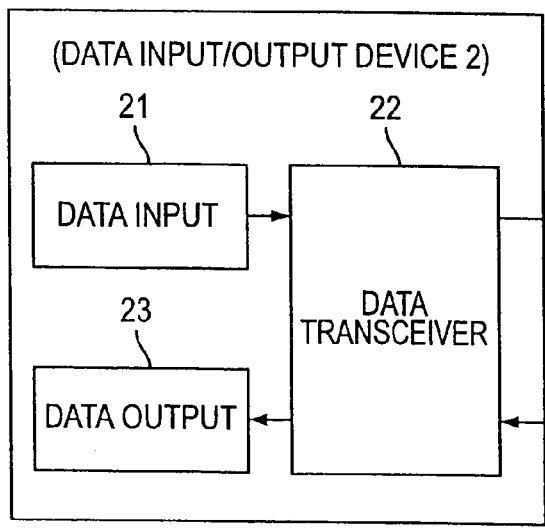
FIG. 1B is a block diagram showing a configuration of a data input/output device provided within the ATM switch.
Figure 1C:
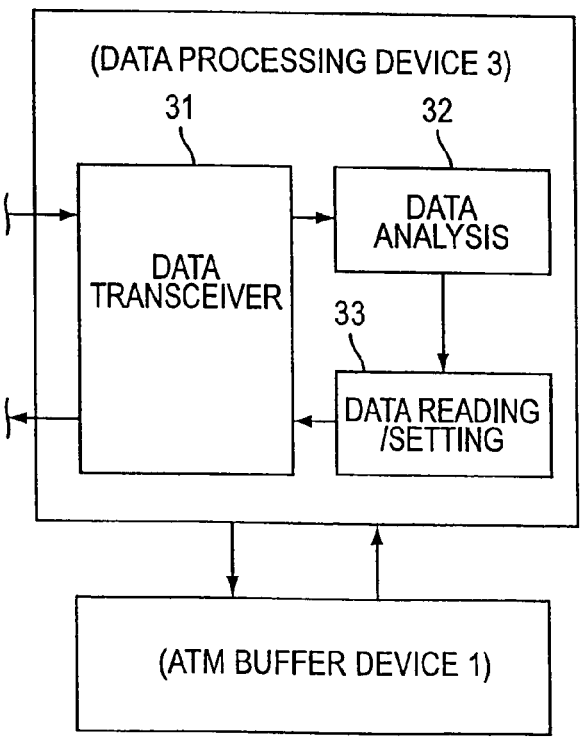
FIG. 1C is a block diagram showing a configuration of a data processing device provided within the ATM switch.

FIGS. 1A, 1B and 1C are block diagrams showing configurations of selected parts of an ATM switch, which is designed in accordance with the preferred embodiment of the invention. Specifically, FIG. 1A shows a configuration of an ATM buffer device 1; FIG. 1B shows a configuration of a data input/output device 2: and FIG. 1C shows a configuration of a data processing device 3.

The ATM switch contains the ATM buffer device 1, the data input/output device 2 and the data processing device 3. Herein, the ATM buffer device 1 is provided at either the input side or output side of the ATM switch, or the ATM buffer devices are respectively provided at both of the input side and output side of the ATM switch. In addition, the data input/output device 2 is configured as "NMS" (i.e., Network Management System), which inputs and outputs data of service classes and/or which receives and transmits data of service classes.

As shown in FIG. 1A, the ATM buffer device 1 is equipped with a buffer section 11 and a cell read section 12.

The buffer section 11 contains maximally "N" buffers (e.g., eight buffers), which are named as "buffer 1", "buffer 2", . . . , "buffer N" respectively. Before the user defines data of service classes, all of the buffers are not defined in relation to the service classes.

The buffer section 11 as a whole has a function to accumulate and/or transmit cells for every service class after the service class is defined so that the ATM switch accepts calls with regard to the service class.

The cell read section 12 has a function to read and transmit cells accumulated in the buffers of the buffer section 11.

As shown in FIG. 1B, the data input/output device 2 is equipped with a data input section 21, a data transceiver section 22 and a data output section 23. Herein, the data input section 21 has a function to enter data using "GUI" (i.e., Graphical User Interface), for example.

The data transceiver section 22 has a function to tranmsit data to the data processing device 3 of the ATM switch as well as a function to receive data from the data processing device 3 of the ATM switch.

The data output section 23 has a function to visually display data on a screen of a display (not shown).

As shown in FIG. 1C, the data processing device 3 is equipped with a data transceiver section 31, a data analysis section 32 and a data reading/setting section 33.

The data transceiver 31 has a function to receive data from the data input/output device 2 and a function to transmit data to the data input/output device 2.

The data analysis section 32 has functions to analyze data and to specify the buffer to be defined in relation to the service class. In other words, it defines which of the buffers to be set (or related) to the service class. In addition, the data analysis section 32 has a function to specify the buffer whose definition data should be read.

The data reading/setting section 33 has a function to define a certain buffer, within the buffer section 11 of the ATM buffer device 1, to be set (or related) to the service class. Or, it has a function to read definition data from the certain buffer.

Figure 2:
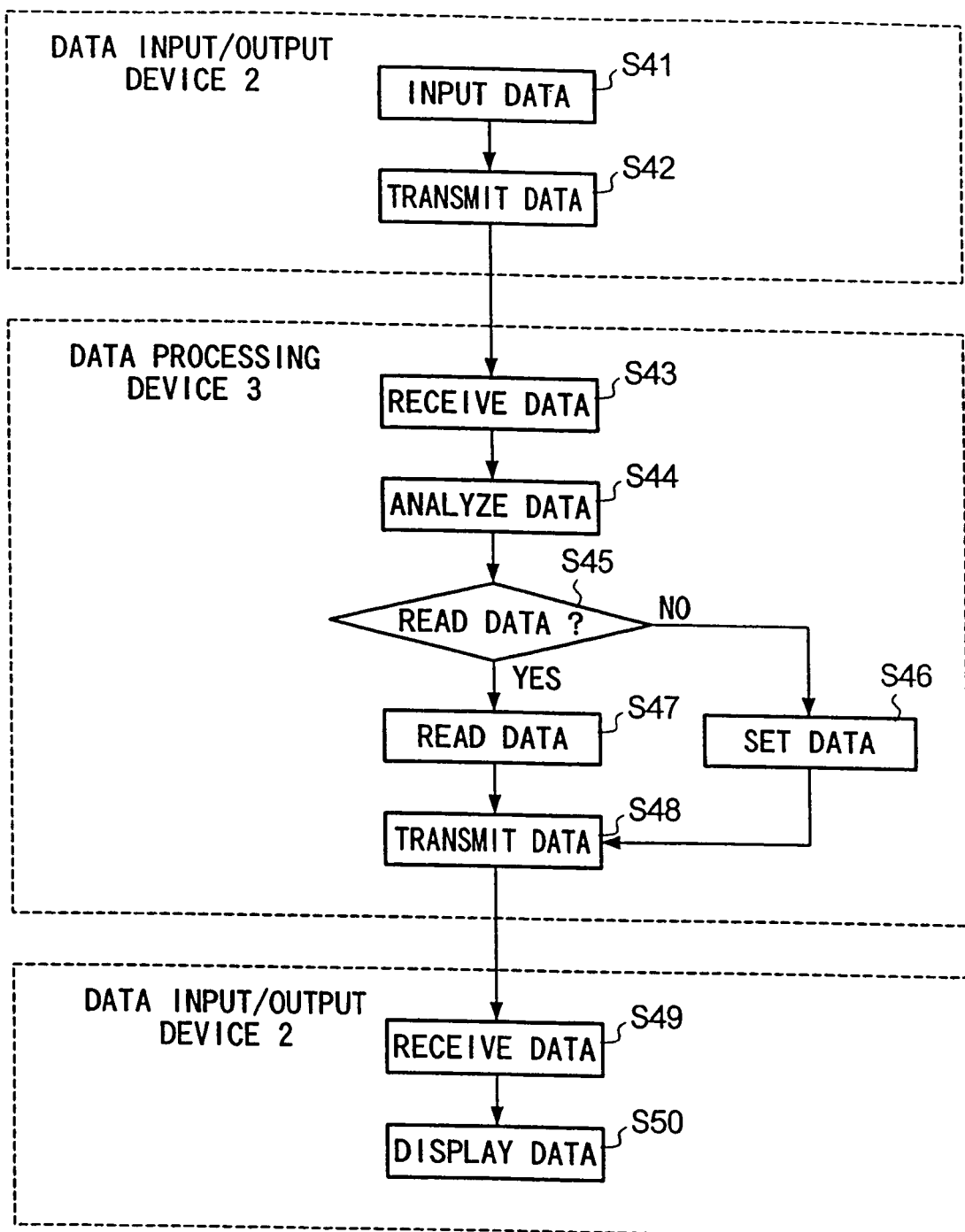
FIG. 2 is a flowchart showing operations of the ATM switch.

Next, operations of the ATM switch will be described in detail with reference to the aforementioned block diagrams of FIGS. 1A, 1B and 1C as well as a flowchar of FIG. 2.

In step S41, the data input section 21 of the data input/output device 2 inputs data of a service class, which are forwarded to the data transceiver section 22 in FIG. 1B.

In step S42, the data transceiver section 22 transmits the data to the data processing device 3 in FIG. 1C.

In step S43, the data transceiver section 31 of the data processing device 3 receives the data from the data input/output device 2, so that the data are forwarded to the data analysis section 32.

In step S44, the data analysis section 32 analyzes the data so as to specify items of the data such as request type, buffer number and service class (i.e., service category and quality of service (QOS) class).

Suppose that the data analysis section 32 analyzes the data whether to designate a setting request or a read request for a buffer number "1" with respect to a certain service class (e.g., service category: CBR, QOS class: 1), for example. In that case, the data analysis section 32 forwards the data to the data reading/setting section 33 in response to the request type, which is either the setting request or the read request. That is, the data processing device 3 transfers control from step S45 to step S46 or step S47.

At a setting request mode corresponding to the setting of the data, the data processing section 3 proceeds to the step S46, wherein the data reading/setting section 33 sets the service class to the buffer whose buffer number is specified within the buffer section 11 of the ATM buffer device 1. Then, the content of such processing of the data reading/setting section 33 is supplied to the data transceiver section 31.

At a read request mode corresponding to the reading of the data, the data processing section 3 proceeds to the step S47, wherein the data reading/setting section 33 reads the service class of the buffer whose buffer number is specified within the buffer section 11 of the ATM buffer device 1. Then, the read service class is supplied to the data transceiver section 31 together with the buffer number.

In step S48, the data transceiver section 31 receives the data from the data reading/setting section 33, so that the data are transmitted to the data input/output device 2.

In step S49, the data transceiver section 22 of the data input/output device 2 receives the data from the data processing device 3, so that the data are forwarded to the data output section 23.

Thereafter, the data input/output device 2 transfers control to step S50. That is, at the mode of the setting of the data, the data output section 23 displays processing results in the setting. At the mode of the reading of the data, the data output section 23 displays contents of the read data.

Figure 3:
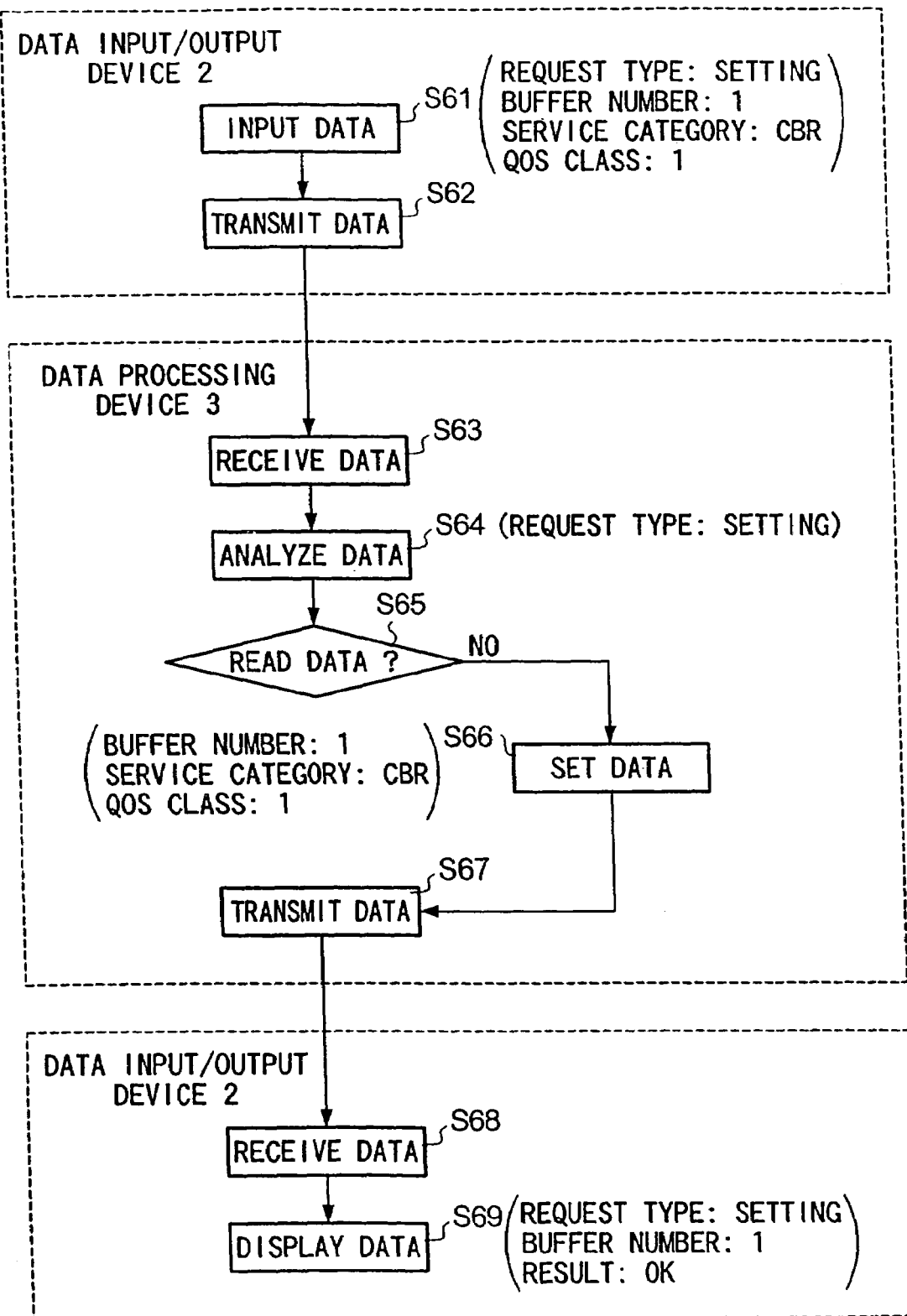
FIG. 3 is a flowchart showing operations of the ATM switch at a data setting mode.

Next, the operations of the ATM switch will be described in further detail with reference to a flowchart of FIG. 3, which shows a concrete example in the setting of the data.

In step S61, the data input/output device 2 inputs data, which designate pieces of information as follows:
Request Type: Setting
Buffer Number: 1
Service Category: CBR
QOS Class: 1

In the above, the QOS class (i.e., quality-of-service class) is defined by cell delay, cell delay variation and cell discard ratio, for example. In addition, the QOS class "1" corresponds to the class that assures a certain level of service quality such as the quality of video of constant rate, for example.

Incidentally, it is possible to define only the service category without designating the QOS class.

The aforementioned data are transmitted from the data input/output device 2 by means of the data transceiver section 22 in step S62. In step S63, the data are received by the data processing device 3.

In the data processing device 3, the data are delivered to the data analysis section 32. In step S64, the data analysis section 32 analizes the request type of the data. In step S65, a decision is made as to whether the data are related to a data read mode or not.

As described above, the present data designate the "setting of data" as the request type. So, the data processing device 3 transfers control to step S66. Thus, the data are set to the designated buffer whose buffer number is "1", wherein the ATM switch defines the service category of CBR and the QOS class "1" with respect to the designated buffer.

In the data setting mode, it is possible to change and delete definition of the service class other than addition of definition with respect to the buffer.

Thereafter, processing results of the data are transmitted from the data processing device 3 by means of the data transceiver 31 in step S67. Thus, the data input/output device 2 receives the processing results of the data in step S68.

In this case, the processing results of the data indicate that no service class is defined with respect to the buffer of the buffer number "1", for example. In other words, result of the setting is "OK" (or completed). So, the data output section 23 of the data input/output device 2 displays contents of the data together with the buffer number "1" in step S69.

If some service class has been already defined with respect to the buffer number "1", result of the setting is "NG". So, the service class will be defined with respect to a buffer of a different buffer number.

Figure 4:
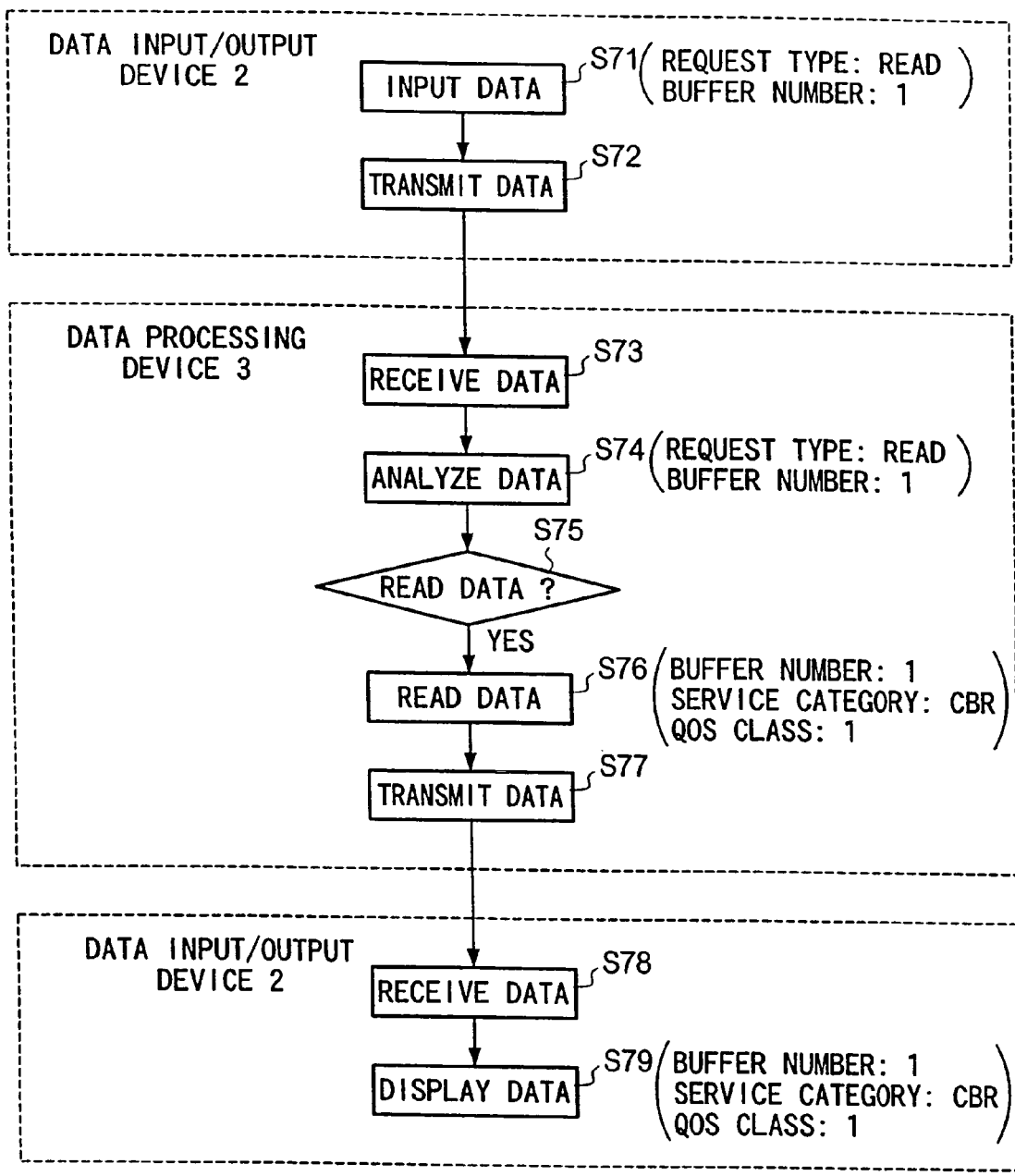
FIG. 4 is a flowchart showing operations of the ATM switch at a data read mode.

FIG. 4 is a flowchart showing operations of the ATM switch with respect to the data read mode.

In step S71, the data input/output device 2 inputs data, which designate pieces of information as follows:
Request Type: Read
Buffer Number: 1

The aforementioned data are transmitted from the data input/output device 2 by means of the data transceiver section 22 in step S72. In step S73, the data processing device 3 receives the data.

In the data processing device 3, the data analysis section 32 analyzes the data with respect to the request type in step S74. In step S75, a decision is made as to whether the data designate the data read mode or not.

In this case, the data designate the data read mode. So, the data reading/setting section 33 reads data of the service class which is defined with respect to the buffer of the buffer number "1" in step S76.

Figure 5:
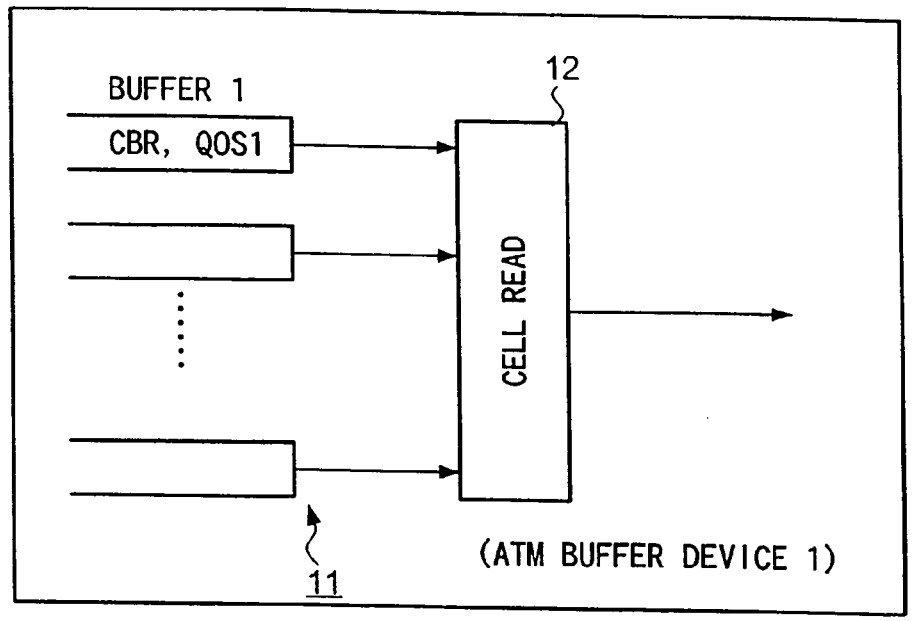
FIG. 5 is a block diagram showing a concrete example in definition of a service class with respect to buffer 1 in the ATM buffer device.

Suppose a concrete example shown in FIG. 5, in which the service class is concretely defined with respect to the buffer 1 within the buffer section 11 shown in FIG. 1. In this example, data of the service class representing the service class of "CBR" and QOS class "1" (or "QOS1") are defined with respect to the buffer 1 having the buffer number "1". So, such data are transmitted from the data processing device 3 by means of the data transceiver section 31 in step S77. In step S78, the data input/output device 2 receives the data.

In step S79, the data output section 23 displays contents of the data of the service class, representing the service category of CBR and QOS class "1", which is defined with respect to the buffer number "1".

If no service class is defined with respect to the buffer 1 of the buffer number "1", the data output section 23 displays a message that no service class is defined with respect to the buffer number "1".

Figure 6:
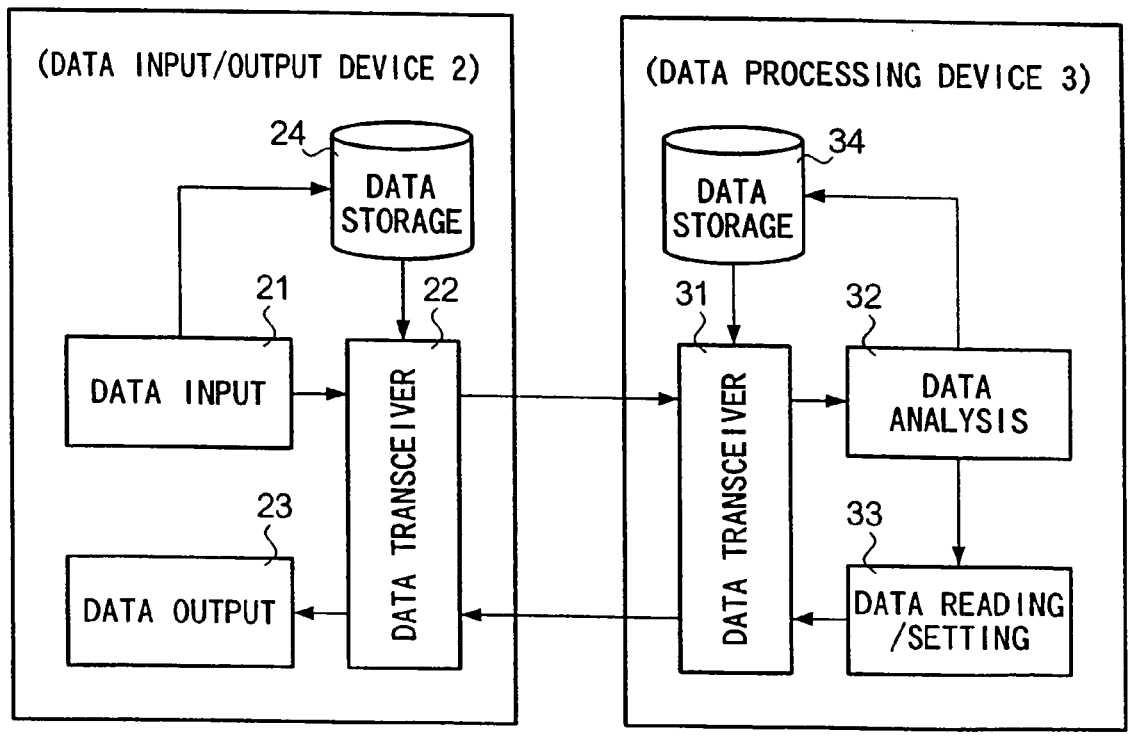
FIG. 6 is a block diagram showing configurations of selected parts of the ATM switch in accordance with another embodiment of the invention.

With reference to FIG. 6, a description will be given with respect to the ATM switch in accordance with another embodiment of the invention.

FIG. 6 is a block diagram showing a configuration of selected parts of the ATM switch of another embodiment of the invention. This ATM switch is basically configured similar to the aforementioned ATM switch shown in FIGS. 1A, 1B and 1C. As compared with the aforementioned configurations shown in FIGS. 1B and 1C, the ATM switch shown in FIG. 6 is characterized by further providing data storage sections 24 and 34 in the data input/output device 2 and the data processing device 3 respectively.

The data storage section 24 has a function to store "new" data of a new service category and a new QOS class, which are designated inside of the data input/output device 2.

In addition, it has another function to delete "unnecessary" data of the service category and QOS class, which are not required anymore.

Similarly, the data storage section 34 has a function to store "new" data of a new service category and a new QOS class, which are designated inside of the data processing device 3.

In addition, it has another function to delete "unnecessary" data of the service category and QOS class, which are not required anymore.

Figure 7:
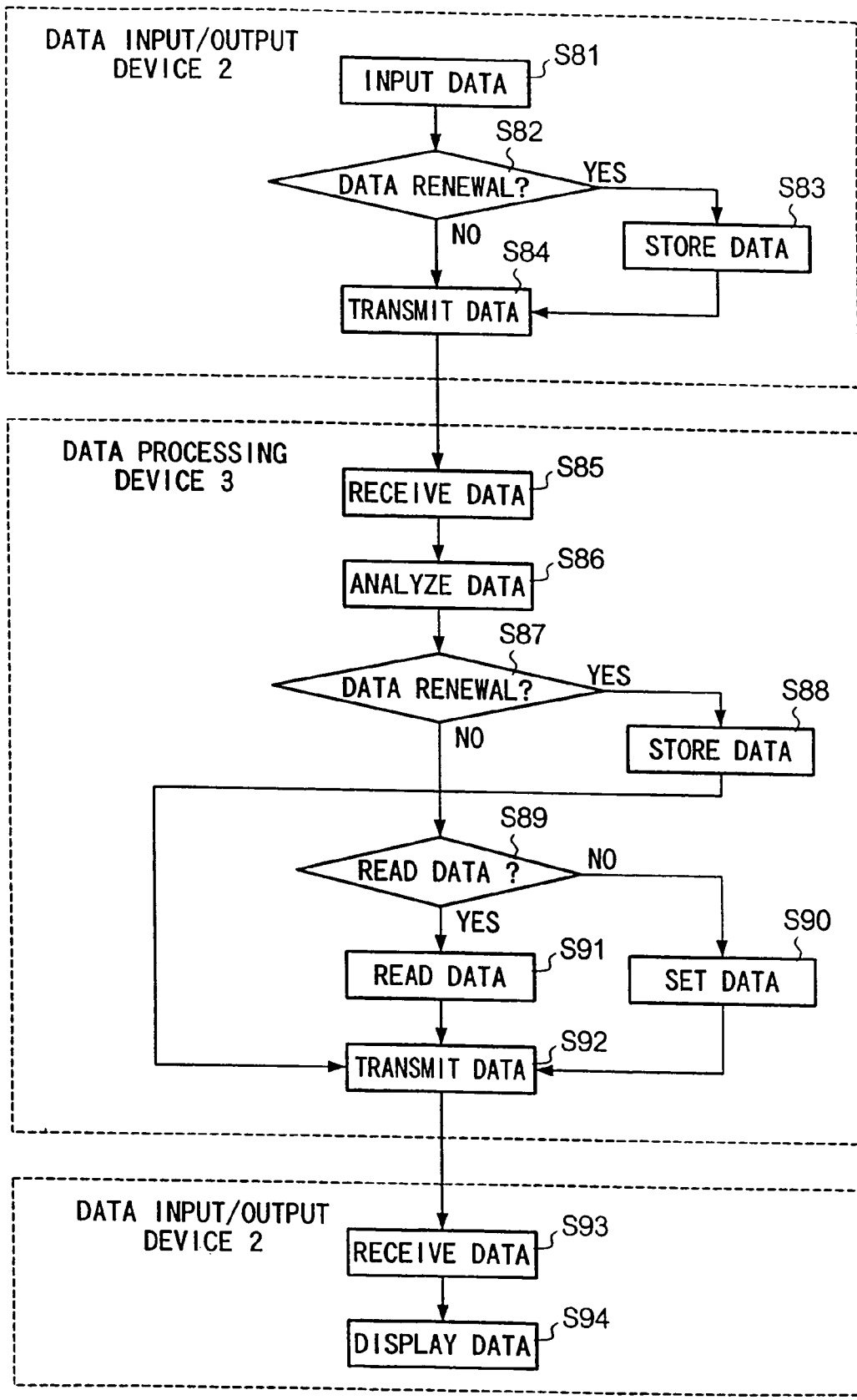
FIG. 7 is a flowchart showing operations of the ATM switch of FIG. 6.

Next, operations of the ATM switch shown in FIG. 6 will be described in detail with reference to a flowchart of FIG. 7.

In step S81, the data input/output device 2 inputs data by means of the data input section 21. In step S82, a decision is made as to whether the input data are related to a data renewal mode or not. In the case of the data renewal mode in which addition or deletion is performed with respect to the service class, the data input/output device 2 transfers control to step S83, wherein the data are supplied to the data storage section 24. The data are renewed with respect to the service category or QOS class and are stored in the data storage section 24. Then, the data are supplied to the data transceiver section 22.

If the input data are not related to the data renewal mode, the data input/output device 2 transfers control from step S82 to step S84. Herein, the data are supplied to the data transceiver section 22. Thus, the data transceiver section 22 transmits the data to the data processing device 3.

In step S85, the data processing device 3 receives the data by means of the data transceiver section 31. Then, the data are forwarded to the data analysis section 32.

In step S86, the data analysis section 32 analyzes the data. In step S87, a decision is made as to whether the data are related to a data renewal mode or not. In the case of the data renewal mode in which addition or deletion is performed with respect to the service class, the data processing device 3 transfers control to step S88, wherein the data are supplied to the data storage section 34.

The data are renewed with respect to the service category or QOS class and are stored in the data storage section 34. Then, the data are supplied to the data transceiver section 31.

If the data are not related to the data renewal mode, the data processing device 3 transfers control from step S87 to step S89. Herein, the data processing device 3 specifies the request type, buffer number and service class (i.e., service category and QOS class) with respect to the data. For example, the data processing device 3 analyzes the data to designate a setting request or a read request for buffer number "2" with respect to a certain service class (e.g., service category: rtVBR, QOS class: 2). So, the data are supplied to the data reading/setting section 33 in response to the setting request or read request.

In the case of the setting request corresponding to the setting of data, the data processing device 3 transfers control from step S89 to step S90. Herein, the data reading/setting section 33 sets the service class to the buffer whose buffer number is specified within the buffer section 11 of the ATM buffer device 1. Then, processing result is supplied to the data transceiver section 31.

In the case of the read request corresponding to the reading of data, the data processing device 3 transfers control from step S89 to step S91. Herein, the data reading/setting section 33 reads the service class of the buffer whose buffer number is specified within the buffer section 11 of the ATM buffer device 1. Then, the service class is supplied to the data transceiver section 31 together with the buffer number.

Thus, the data transceiver section 31 receives the data from the data reading/setting section 33 and the data storage section 34. In step S92, the data transceiver section 31 transmits the data to the data input/output device 2.

In step S93, the data input/output device 2 receives the data by means of the data transceiver section 22. Then, the data are supplied to the data output section 23.

In step S94, the data output section 23 performs a display process. That is, the data output section 23 displays the processing result in setting of the data in response to the setting request, while it displays the read data in response to the read request. At the data renewal mode, the data output section 23 displays the processing result in renewal of the data.

Figure 8:
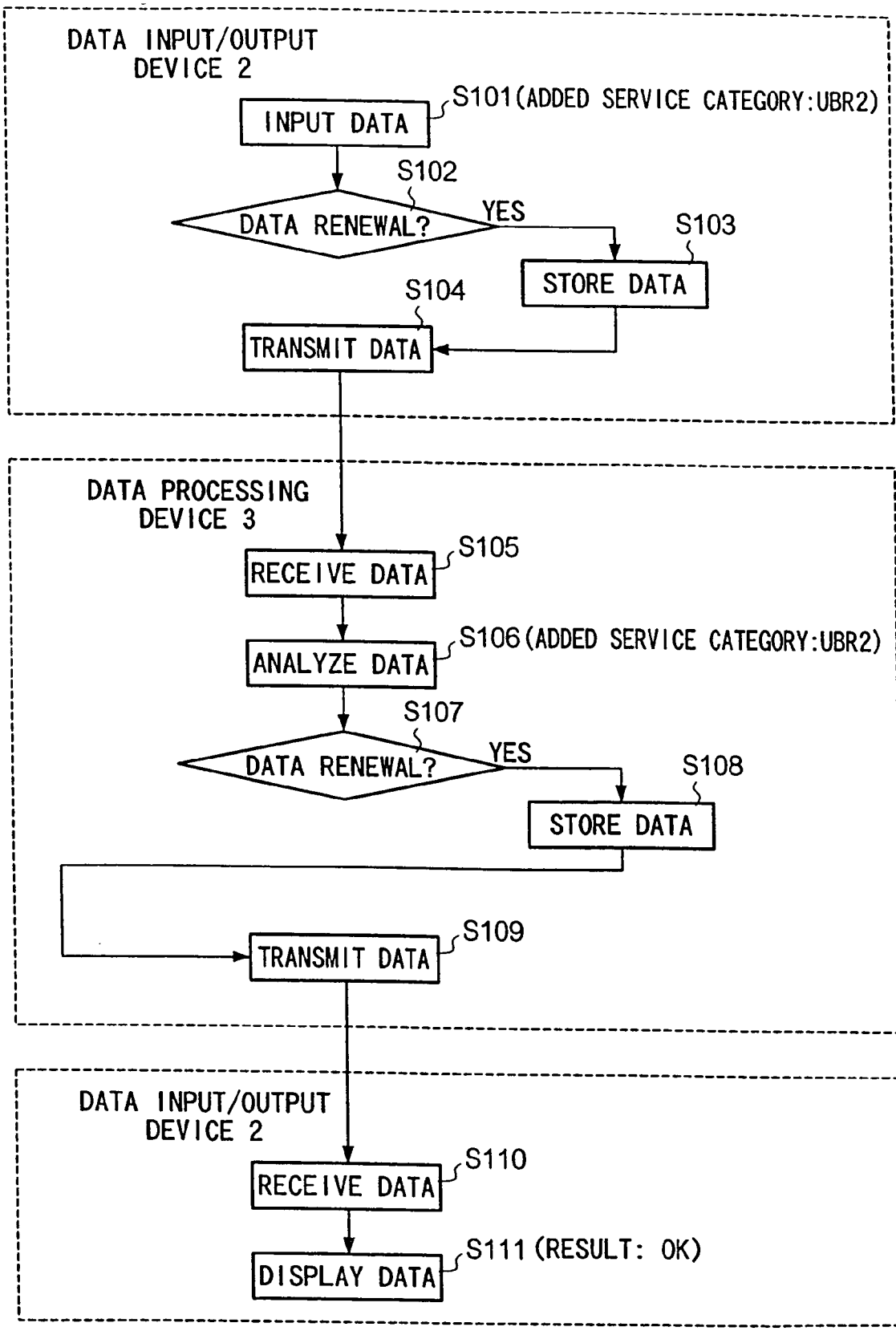
FIG. 8 is a flowchart showing operations of the ATM switch of FIG. 6 at a data renewal mode.
Figure 9:
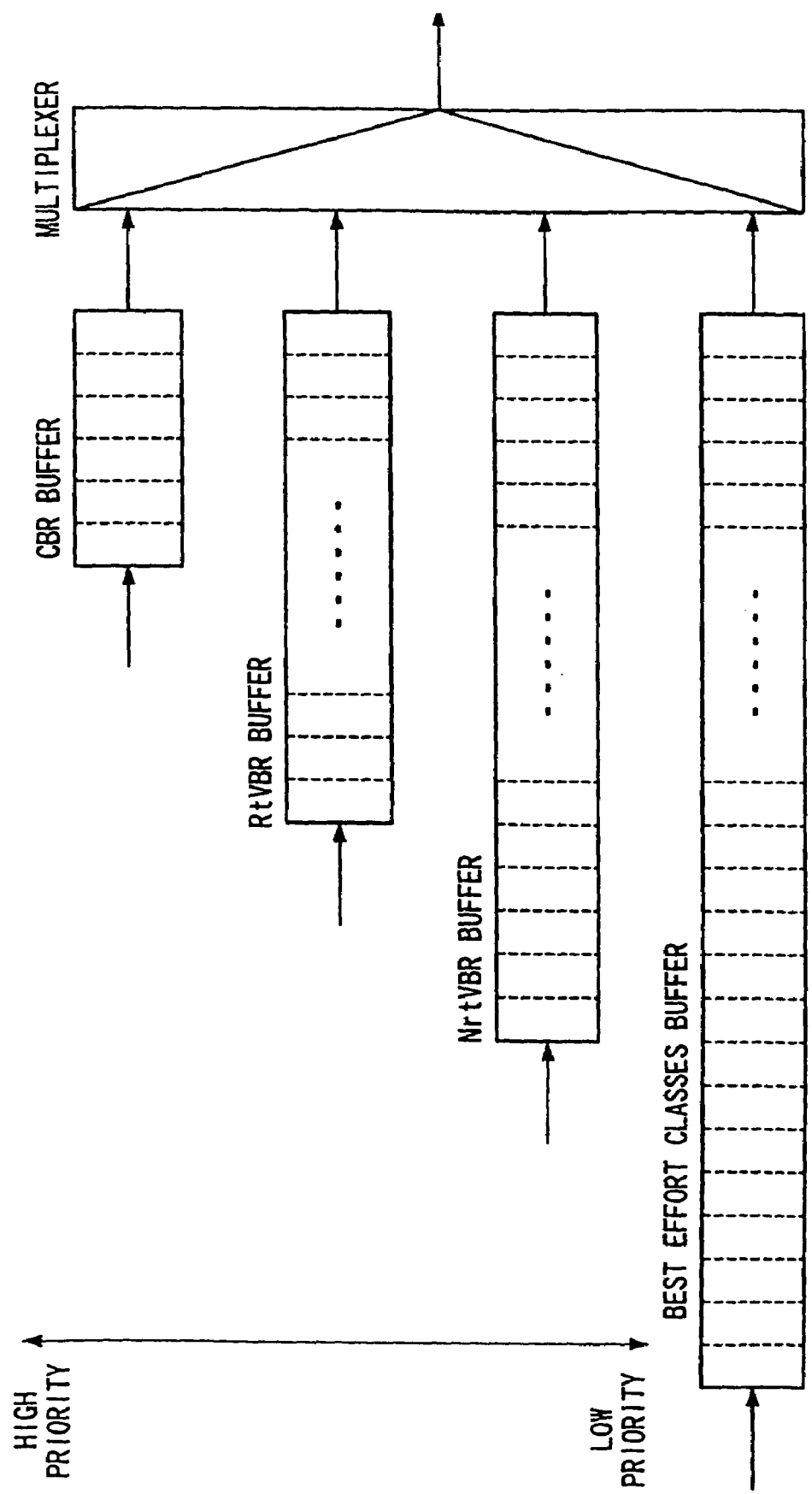
FIG. 9 is a block diagram showing a part of the conventional ATM switch having output buffers which are provided to cope with different service categories respectively.

Next, FIG. 8 is a flowchart showing another example of operations of the ATM switch of FIG. 6 at the data renewal mode.

In step S101, the data input/output device 2 inputs data. In step S102, a decision is made as to whether a request type of the data corresponds to data renewal or not. Now, suppose that a new service category corresponds to "UBR2" which is provided by adding a minimum (bit) rate assurance to "UBR", for example.

In the above case, the data input/output device 2 transfers control to step S103. Herein, the data are renewed (or added) and are stored in the data storage section 24. Then, the data are supplied to the data transceiver section 22. In this case, the data input section 21 senses stored content of the data. Thereafter, it becomes possible to designate a new service category. In step S104, the data input/output device 2 transmits the data by means of the data transceiver section 22. In step S105, the data processing device 3 receives the data.

In step S106, the data analysis section 32 analyzes the request type of the data. In step S107, a decision is made as to whether the request type of the data corresponds to data renewal or not.

In this case, the request type of the data corresponds to the data renewal, so the data processing device 3 transfers control to step S108. That is, the data are renewed (or added) and stored in the data storage section 34. Then, the data are forwarded to the data transceiver section 31.

Incidentally, the data reading/setting section of the data processing device 3 and the aforementioned ATM buffer device 1 sense stored content of the data. Thereafter, it becomes possible to define a new service category.

Then, the data processing device 3 transmits processing result of the data in step S109. In step S110, the data input/output device 2 receives the data.

The aforementioned processing result indicates renewal of the service category, wherein the new service category is added and stored. So, in step S111, the data output section 23 displays renewed content of the data because the data renewal is certainly completed so that the processing result in data renewal is "OK".

By the way, if the same of the new service category has been already added to the data storage sections 24 and 34, the data renewal is incomplete so that the processing result in data renewal is "NG". Thus, the data output section 23 displays a message indicating "NG" in the data renewal.

As described heretofore, this invention has a variety of technical features and effects, which can be summarized as follows:

(1) This invention is capable of defining the service class, input by the data input section, for the corresponding buffer within the ATM switch by means of the data setting section. So, the user is capable of freely defining the service classes for the buffers within the ATM switch. As a result, it is possible to improve usability of the ATM switch.

(2) The user is capable of adding, changing or deleting the service class for the buffer within the ATM switch. This further improves the usability of the ATM switch. In addition, it is possible to delete "unnecessary" service classes. So, it is possible to efficiently use the resources (e.g., buffers) of the ATM switch.

(3) This invention is designed such that the user is capable of requesting the data reading section of the ATM switch to read data from the buffer whose buffer number is displayed by the data output section. So, it is possible for the user to execute reading of the service class with respect to the buffer within the ATM switch. As a result, it is possible to improve maintenance of the ATM switch.

(4) This invention is designed such that the data input/output device and data processing device are equipped with the data transceiver sections respectively. So, it is possible to perform defining and reading on the service classes of the buffers of the ATM switches respectively by means of the ATM network. As a result, it is possible to improve maintenance of the ATM switches as well as usability of the ATM network.

(5) This invention is designed such that data regarding the new service class and new QOS class are renewed and are stored in the data storage section(s). So, the ATM switch is capable of coping with the new service category and new QOS class smoothly. As a result, it is possible to improve extendibility of the ATM switch and ATM network.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A multi-service-class definition type switch comprising:
    a buffer device which comprises a buffer section having a plurality of buffers and a cell reading section for reading data from the buffer section;
    a data input/output device which comprises a data input section for inputting data from an external source, a data output section for outputting the data, and a first data transceiver section for performing reception and transmission with respect to the data;
    a data processing device which comprises a second data transceiver for performing reception and transmission of data in connection with the first data transceiver section, a data analysis section for analyzing the data received from the second data transceiver section, and a data reading/setting section;
    wherein the data input/output device is capable of inputting and outputting, data regarding a service class of a buffer, comprising at least one of a service category and a QOS class; and
    wherein the data processing device is capable of adding and storing new data regarding at least one of a new service category and a new QOS class.

2. A multi-service-class definition type switch according to claim 1 wherein the data processing device performs processing regarding reception, transmission and analysis on data regarding a service class, a buffer number and a request type, so that reading and setting of the data can be made with respect to a prescribed buffer selected from the buffer section in response to a result of the processing.

3. A multi-service-class definition switch according to claim 1, wherein the switch is an ATM switch.

4. A multi-service-class definition type switch comprising:
    a buffer device which comprises a buffer section having a plurality of buffers and a cell reading section for reading data from the buffer section;
    a data input/output device which comprises a data input section for inputting data from an external source, a data output section for outputting the data, and a first data transceiver section for performing reception and transmission with respect to the data; and
    a data processing device which comprises a second data transceiver for performing reception and transmission of data in connection with the first data transceiver section, a data analysis section for analyzing the data received from the second data transceiver section, and a data reading/setting section;
    wherein the data input/output device is capable of inputting and outputting data regarding a service class of a buffer, comprising at least one of a service category and a QOS class;
    wherein the data processing device is capable of adding and storing new data regarding at least one of a new service category and a new QOS class; and
    wherein the data input/output device comprises a graphical user interface that displays at least one of the new service category and new QOS class.

5. A multi-service-class definition type switch comprising:
    a data input/output device, comprising a data input section and a data output section;
    a data processing device, comprising:
        a transceiver section for receiving and transmitting data to and from said data input/output device,
        a data analysis section for analyzing the data received from said data transceiver section, and
        a data reading/setting section; and
    a buffer device comprising:
        a plurality of buffers, at least one of which has not previously been assigned a service class and
        a cell reading section;
        wherein said input/output device is capable of receiving data comprising a new service class and transmitting said data to said data processing device, and wherein said data reading/setting section is capable of assigning the new service class to one of said at least one buffer which has not previously been assigned a service class.

* * * * *